March 10, 1942.  E. R. CARTER  2,276,225
BEARING SEAL
Filed March 1, 1939
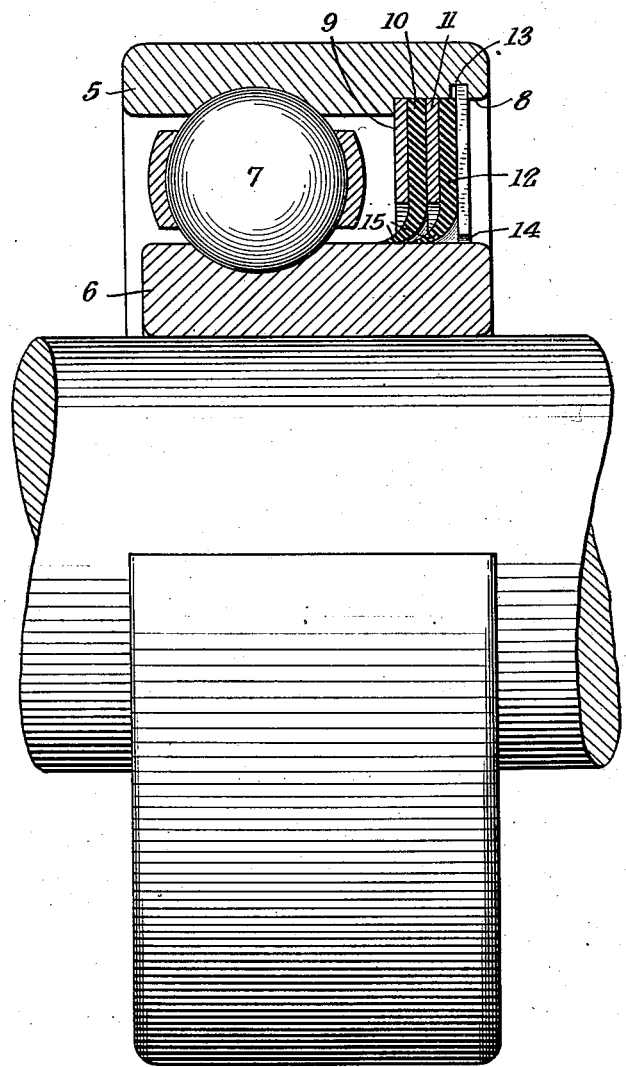
INVENTOR
E. R. CARTER
BY
ATTORNEYS Patented Mar. 10, 1942

2,276,225

UNITED STATES PATENT OFFICE 2,276,225

BEARING SEAL

Edgar R. Carter, New Britain, Conn., assignor to The Fafnir Bearing Company, New Britain, Conn., a corporation of Connecticut Application March 1, 1939, Serial No. 259,181

1 Claim. (Cl. 286—5)

My invention relates to a bearing seal.

It is the general object of my invention to provide an improved form of seal which is simple in construction, cheap to manufacture, easy to apply, and very effective in holding lubricant in a bearing.

The drawing which shows, for illustrative purposes only, a preferred form of the invention is an edge view in quarter section of a ball bearing illustrating my improved seal in place.

The invention will be described as embodied in a ball bearing of more or less standard construction. The bearing may comprise an outer bearing ring 5, an inner ring 6, with interposed balls 7, which in the form shown fit in raceways and serve to hold the bearing in unit handling relationship.

In the preferred form shown the outer ring is provided with a counterbore 8 extending in from one edge thereof. The improved seal is mounted and held in the counterbore. In the preferred form a continuous backing plate or washer 9 or more or less rigid material, for example sheet metal, is seated in the bottom of the counterbore 8. The backing plate 9 is of annular disk form provided with radial clearance between its bore and the outside diameter of the inner ring. A sealing disk 10 is seated on the outer face of the backing disk 9 and is itself backed up by a second backing disk 11 similar to the disk 9. A second sealing disk 12 is seated on the backing plate 11 and a backing plate and sealing disk assembly is held in place by suitable means. As illustrated, I provide a circumferentially extending groove 13 in the wall of the counterbore adjacent the edge of the outer ring and an annular split ring or disk 14 is snapped into the annular groove 13 and in being snapped into place preferably compresses the sealing disks to some extent and makes a tight, secure seal.

The inner diameters of the backing disks 9—11 and the securing split ring or disk 14 may be substantially the same and provided with radial clearance around the outside diameter of the inner ring, but in any event it is desirable to have the disk 14 in close sealing proximity to the inner ring as shown. The sealing disks 10—12, when both are employed, are preferably of duplicate construction and are formed of suitable, resilient, non-absorbent, oil resistant material, such as suitably treated leather or artificial rubber of the general kind known in the trade as "neoprene," "Thiokol," etc. These seal plates are continuous annular washers or annular disks, the outer circumferential edges of which preferably fit within and abut the counterbore as shown. The normal inner diameters of the seal disks 10—12 are slightly less than the outside diameter of the inner ring 6 upon which they are seated. The inner edges of the seal plates 10—12 are tapered as indicated at 15 so as to form very flexible inner edges or lips and these inner edges are distorted inwardly and extend over the outer surface of the inner bearing ring so that they resiliently, yet quite securely, engage the outer surface of the inner bearing ring; that is to say, the seal plates have a firm running fit on the inner ring but due to the resiliency of the plates and their non-absorbent character they are well lubricated and the friction is slight. Any pressure of lubricant in the bearing tending to pass the seal plates will serve only to cause those plates to more tightly engage the outer surface of the inner ring and thus tend to prevent any passage of lubricant past them. The space between the two rings 10—12 may act as a reservoir for any small amount of lubricant which may pass the innermost ring 10, and the second seal plate 12 prevents it from passing outwardly along the inner ring.

My improved seal is very simple in construction, is formed of few and relatively cheap parts, and has proven to be highly effective in use. Clearly in a properly designed bearing duplicate seals could be put on each side of the anti-friction bearing members so as to provide a completely enclosed bearing.

While the invention has been described in considerable detail and a preferred form illustrated, it is to be understood that various changes and modifications may be made within the scope of the invention as defined in the appended claim.

I claim:

Seal means for the space between two relatively rotatable spaced apart inner and outer members, the outer of said members having a counterbore extending in from one end, an annular backing plate in said counterbore and seated on the bottom thereof, said plate being of an outer diameter to be snugly received in said counterbore without radial distortion, said outer ring having a circumferentially extending groove in the bore of said counterbore and adjacent the outer end thereof, a split resilient annular closure plate sprung into said groove and held thereby against outward axial displacement, the radially inner edge of said closure plate lying in sealing proximity to the outer surface of said inner member, at least one annular seal disk of oil-resistant rubber-like material in said counterbore and held flatwise between said closure and backing plates, said seal disk being of a radial width greater than the distance from said counterbore to the outer surface of said inner ring, the inner edge of said seal disk being distorted sidewise into sealing engagement with the outer surface of said inner member, the inner edge of said backing plate being substantially spaced from said inner member so as to permit substantial sidewise distortion of the inner edge of said seal disk.

EDGAR R. CARTER.